(12) United States Patent
Srini

(10) Patent No.: US 11,507,087 B2
(45) Date of Patent: Nov. 22, 2022

(54) DISTRIBUTED INTEGRATED SENSING AND COMMUNICATION MODULE

(71) Applicant: GM Cruise Holdings LLC, San Francisco, CA (US)

(72) Inventor: Vason Srini, Berkeley, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 0 days.

(21) Appl. No.: 16/182,781

(22) Filed: Nov. 7, 2018

(65) Prior Publication Data

US 2020/0142406 A1 May 7, 2020

(51) Int. Cl.
| | |
|---|---|
| G05D 1/00 | (2006.01) |
| G01S 13/86 | (2006.01) |
| G01S 7/00 | (2006.01) |
| G01S 7/481 | (2006.01) |
| G05D 1/02 | (2020.01) |

(52) U.S. Cl.
CPC ............ *G05D 1/0088* (2013.01); *G01S 7/003* (2013.01); *G01S 7/4813* (2013.01); *G01S 13/865* (2013.01); *G01S 13/867* (2013.01); *G05D 1/0248* (2013.01); *G05D 1/0257* (2013.01)

(58) Field of Classification Search
None
See application file for complete search history.

(56) References Cited

U.S. PATENT DOCUMENTS

| | | | |
|---|---|---|---|
| 9,632,590 | B2 | 4/2017 | Kramer et al. |
| 9,915,950 | B2 | 3/2018 | Hartung et al. |
| 10,036,801 | B2 | 7/2018 | Retterath et al. |
| 10,118,618 | B2 | 11/2018 | Pawlicki et al. |
| 2003/0201929 | A1* | 10/2003 | Lutter ................... G01S 13/931 342/72 |
| 2010/0001897 | A1* | 1/2010 | Lyman ................... G01S 17/86 701/93 |
| 2010/0271614 | A1* | 10/2010 | Albuquerque ........ G01S 7/4811 356/4.01 |
| 2011/0095910 | A1* | 4/2011 | Takano .................... G06T 11/00 340/932.2 |
| 2015/0021081 | A1* | 1/2015 | Mitarai ............. H01L 23/49833 174/260 |
| 2019/0129013 | A1* | 5/2019 | Gilliland ............... G01S 7/4813 |
| 2019/0310375 | A1* | 10/2019 | Finkelstein ........... G01S 7/4868 |
| 2019/0332875 | A1* | 10/2019 | Vallespi-Gonzalez ....................... G05D 1/0088 |
| 2020/0301013 | A1* | 9/2020 | Banerjee ............... G01S 13/867 |

* cited by examiner

*Primary Examiner* — Yuen Wong
*Assistant Examiner* — Hongye Liang
(74) *Attorney, Agent, or Firm* — Calfee, Halter & Griswold LLP

(57) ABSTRACT

A distributed integrated sensing and communication (DISC) module for an autonomous vehicle is described herein. The DISC module includes at least a first sensor system, a second sensor system, a processor, and memory. The first sensor system and the second sensor system are different types of sensor systems. The first sensor system outputs a first sensor signal, and the second sensor system outputs a second sensor signal. The DISC module can detect and track an object (or objects) based on the first sensor signal and the second sensor signal. Moreover, the DISC module can output data indicative of the object as detected. In the DISC module, the first sensor system, at least a portion of the second sensor system, the processor, and the memory are integrated on a single substrate.

20 Claims, 9 Drawing Sheets

DISTRIBUTED INTEGRATED SENSING AND COMMUNICATION MODULE

BACKGROUND

An autonomous vehicle is a motorized vehicle that can operate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals outputted by the sensor systems. Sensor signals are typically provided to a centralized computing system in communication with the plurality of sensor systems. The sensor signals are typically processed by the centralized computing system to detect one or more objects within proximity of the autonomous vehicle. Further, based at least in part upon the detected object(s) within proximity of the autonomous vehicle, one or more mechanical systems of the autonomous vehicle can be controlled. Examples of the mechanical systems include a vehicle propulsion system, a braking system, and a steering system.

Conventionally, sensor systems of different modalities are in separate physical modules in an autonomous vehicle. For instance, an image sensor system, a radar sensor system, and a lidar sensor system traditionally can be in separate physical modules in an autonomous vehicle. However, the differing types of sensor systems in separate physical modules can occupy significant amounts of space within the autonomous vehicle, require considerable wiring (e.g., between the separate physical modules and a centralized computing system), and rely on a centralized computing system within the autonomous vehicle to analyze outputs from the sensor systems.

Traditional utilization of a centralized computing system with separate physical modules for the differing types of sensor systems can be a source of reliability problems, for instance, due to heat generation and compute availability. In these traditional architectures, time synchronization of the different types of sensor systems comprised in the discrete physical modules can be challenging. For example, accuracy of an output of the centralized computing system can rely on synchronization of different sensor signals within microseconds or tenths of microseconds. However, such synchronization in conventional architectures can be detrimentally impacted by mechanical vibration, which can be particularly impactful at interfaces within these architectures (e.g., at an interface between a physical module of a particular type of sensor system and a wire, at an interface between a wire and the centralized computing system). Thus, an autonomous vehicle in different operating conditions (e.g., stopped versus in motion, moving at different speeds, driving on a smooth road versus over a rough surface) can experience differing mechanical vibrations, which can impact the synchronization of the sensor signals in conventional architectures. Moreover, while conventional autonomous vehicles typically include more than one of a given type of sensor system (e.g., more than one lidar sensor system, more than one radar sensor system, more than one camera sensor system), integrating these sensor systems and providing a high degree of fault tolerance and graceful degradation when one of the sensor systems fails can be a challenge.

SUMMARY

The following is a brief summary of subject matter that is described in greater detail herein. This summary is not intended to be limiting as to the scope of the claims.

Described herein are various technologies pertaining to a distributed integrated sensing and communication (DISC) module for an autonomous vehicle. With more specificity, described herein are various technologies pertaining to integrating a plurality of sensor systems (e.g., lidar, radar, camera, near infrared), at least one localization system (e.g., an inertial measurement unit (IMU), a global positioning system (GPS) receiver), computing (e.g., processor(s) and memory), and/or a communication system into a single DISC module that generates an output based upon the incorporated systems. Integrating the foregoing in a single physical module enables distributed analysis of sensor signals to be performed within an autonomous vehicle. Thus, as opposed to conventional architectures where raw sensor signals are sent to a centralized computing system in an autonomous vehicle (e.g., which can lead to reliability problems, can be detrimentally impacted by vibration, etc. as noted above), the sensor signals from differing types of sensor systems can be evaluated at the DISC module. For instance, solid state sensor systems, localization system(s), computing, and a communication system can be integrated in a single physical DISC module, which can allow for combined object detection, segmentation, tracking, etc. to be performed (e.g., at a coarse level) at the DISC module. Data generated at the DISC module based on the sensor signals can thereafter be outputted (e.g., transmitted to a computing system in an autonomous vehicle, combined with data outputted by other DISC modules in an autonomous vehicle).

According to various embodiments, a DISC module can include a first sensor system and a second sensor system. The first sensor system can be configured to output a first sensor signal, and the second sensor system can be configured to output a second sensor signal. Moreover, the first sensor system and the second sensor system can be different types of sensor systems. The DISC module can further include a processor and memory. The DISC module can detect an object based on the first sensor signal and the second sensor signal. The object can be in an environment within vicinity of the DISC module (e.g., within a field of view of the first sensor system and the second sensor system). For instance, the object can be a vehicle, a person, a bicycle, or substantially any other type of object that can be detected in the environment. Moreover, the DISC module can output data indicative of the object as detected. In the DISC module, the first sensor system, at least a portion of the second sensor system, the processor, and the memory are integrated on a single substrate. While the DISC module is described above as including two sensor systems, it is contemplated that the DISC module can include more than two sensor systems, each of which are different types of sensor systems (e.g., a third sensor system can be integrated on the single substrate, a third sensor signal from the third sensor system can be used to detect the object). Further, the DISC module can include a communication system, an IMU, and/or a GPS receiver, each of which can be integrated on the single substrate.

Pursuant to various embodiments, one of the sensor systems (e.g., the second sensor system) can be a lidar sensor system. The lidar sensor system can include one or more lidar transmitters and one or more lidar receivers. Following this example, the lidar transmitters can be integrated on the single substrate with the first sensor system, the processor, and the memory. Further, the lidar receivers can be integrated on a different substrate separate from the single substrate (e.g., the single substrate and the different substrate can be in a common package or housing, the single substrate and the different substrate can be electrically coupled). Pursuant to the foregoing example, the single substrate can be formed of silicon and the different substrate can be formed of a semiconductor material. Moreover, the DISC module can control the lidar transmitters during a given time period (e.g., to cause a first subset of the lidar transmitters to transmit during the given time period and a second subset of the lidar transmitters to not transmit during the given time period, to control a power level of the lidar transmitters in the first subset that are transmitting during the given time period).

Moreover, in accordance with various embodiments, an autonomous vehicle can include a DISC module and a computing system that is in communication with the DISC module. The DISC module can include at least the first sensor system, the second sensor system, the processor, and the memory as noted above. Again, the DISC module can detect an object based on at least the first sensor signal from the first sensor system and the second sensor signal from the second sensor system. The DISC module can also output data indicative of the object as detected. Further, the computing system can receive the data indicative of the object as detected (as well as other data sent from the DISC module).

Moreover, it is to be appreciated that the autonomous vehicle can include a plurality of DISC modules (e.g., the DISC modules can each be substantially similar to the DISC module described above). The DISC modules can be oriented on the autonomous vehicle towards differing portions of an environment in which the autonomous vehicle is located.

According to various embodiments, a DISC module can operate as follows. A first sensor signal can be received (at the DISC module) from a first sensor system of the DISC module, and a second sensor signal can be received (at the DISC module) from a second sensor system of the DISC module. As noted above, the first sensor system and the second sensor system are different types of sensor systems. Moreover, an object can be detected, utilizing a processor of the DISC module, based on the first sensor signal and the second sensor signal. Further, data indicative of the object as detected can be transmitted, utilizing a communication system of the DISC module, to a computing system of an autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
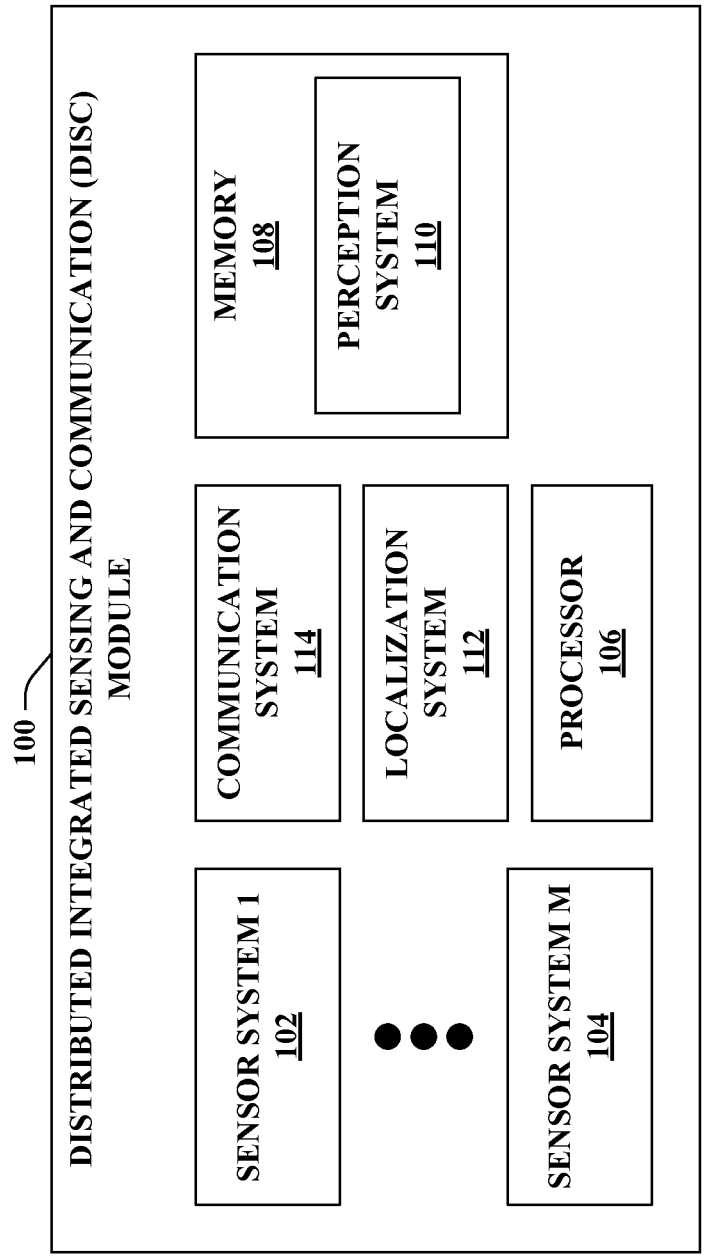
FIG. 1 illustrates a block diagram of an exemplary distributed integrated sensing and communication (DISC) module.

Various technologies pertaining to a distributed integrated sensing and communication module for an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, to the extent that the term "includes" is used in either the detailed description or the claims, such term is intended to be inclusive in a manner similar to the term "comprising" as "comprising" is interpreted when employed as a transitional word in a claim.

Additionally, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

Turning now to the drawings, FIG. 1 illustrates an exemplary distributed integrated sensing and communication (DISC) module 100. The DISC module 100 includes a sensor system 1 102, . . . , and a sensor system M 104, where M can be substantially any integer greater than one (collectively referred to herein as sensor systems 102-104). The sensor system 1 102 is configured to output a first sensor signal, and the sensor system M 104 is configured to output an Mth sensor signal. Moreover, the sensor systems 102-104 are different types of sensor systems (e.g., the sensor system 1 102 and the sensor system M 104 are different types of sensor systems).

The DISC module 100 further includes a processor 106 and memory 108 that includes computer-executable instructions that are executable by the processor 106. While the DISC module 100 is depicted in FIG. 1 as including one processor (e.g., the processor 106), it is contemplated that the DISC module 100 can include a plurality of processors in other embodiments.

The memory 108 can include a perception system 110 that can detect an object based on the sensor signals from the sensor systems 102-104. The object can be in an environment within vicinity of the DISC module 100 (e.g., within a field of view of the sensor systems 102-104). For instance, the object can be a vehicle, a person, a bicycle, or substantially any other type of object that can be detected in the environment. Moreover, data indicative of the object as detected by the perception system 110 can be outputted by the DISC module 100. According to various embodiments, the perception system 110 can further track the object over time. Thus, the data outputted by the DISC module 100 can further be indicative of the tracking of the object over time by the perception system. However, it is also contemplated in other embodiments that at least a portion of a perception system, such as fine tracking, can be executed by a computing system of an autonomous vehicle in communication with the DISC module 100.

In the DISC module 100, the processor 106, the memory 108, and at least portions of the sensor systems 102-104 are integrated on a single substrate. According to an example, the sensor systems 102-104 can include a first sensor system and a second sensor system. Following this example, the first sensor system, at least a portion of the second sensor system, the processor 106, and the memory 108 are integrated on the single substrate. The perception system 110 can detect an object based on a first sensor signal outputted from the first sensor system and a second sensor signal outputted from the second sensor system. According to an illustration, the first sensor system can be a visible image sensor system, a radar sensor system, or an infrared sensor system. Moreover, the second sensor system can be a visible image sensor system, a radar sensor system, an infrared sensor system, or a lidar sensor system. As described above, the first sensor system and the second sensor system are different types of sensor systems.

The DISC module 100 can also include a localization system 112. Examples of the localization system 112 include an inertial measurement unit (IMU) or a global positioning system (GPS) receiver. The localization system 112 can further be integrated on the single substrate.

Moreover, the DISC module 100 can include a communication system 114. The communication system 114 can wirelessly transmit the data indicative of the object as detected from the DISC module 100 (e.g., to a computing system of an autonomous vehicle that includes the DISC module 100). Likewise, other data generated by the DISC module 100 can similarly be wirelessly transmitted by the communication system 114. The communication system 114 can also be integrated on the single substrate. According to other embodiments, however, it is contemplated that the data can be sent from the DISC module 100 via a wired connection (e.g., via a wire between the DISC module 100 and a computing system of an autonomous vehicle).

Computing in the DISC module 100 (e.g., edge computing) can allow sensor signals to be processed in a multi-sensor integrated manner. Moreover, such edge computing can reduce wiring harness complexity and can allow heat dissipation to be distributed as compared to conventional approaches that employed centralized computing to evaluate raw sensor signals. Further, integration of components in the DISC module 100 as well as edge computing can reduce energy requirements for an autonomous vehicle that includes the DISC module 100.

Figure 2:
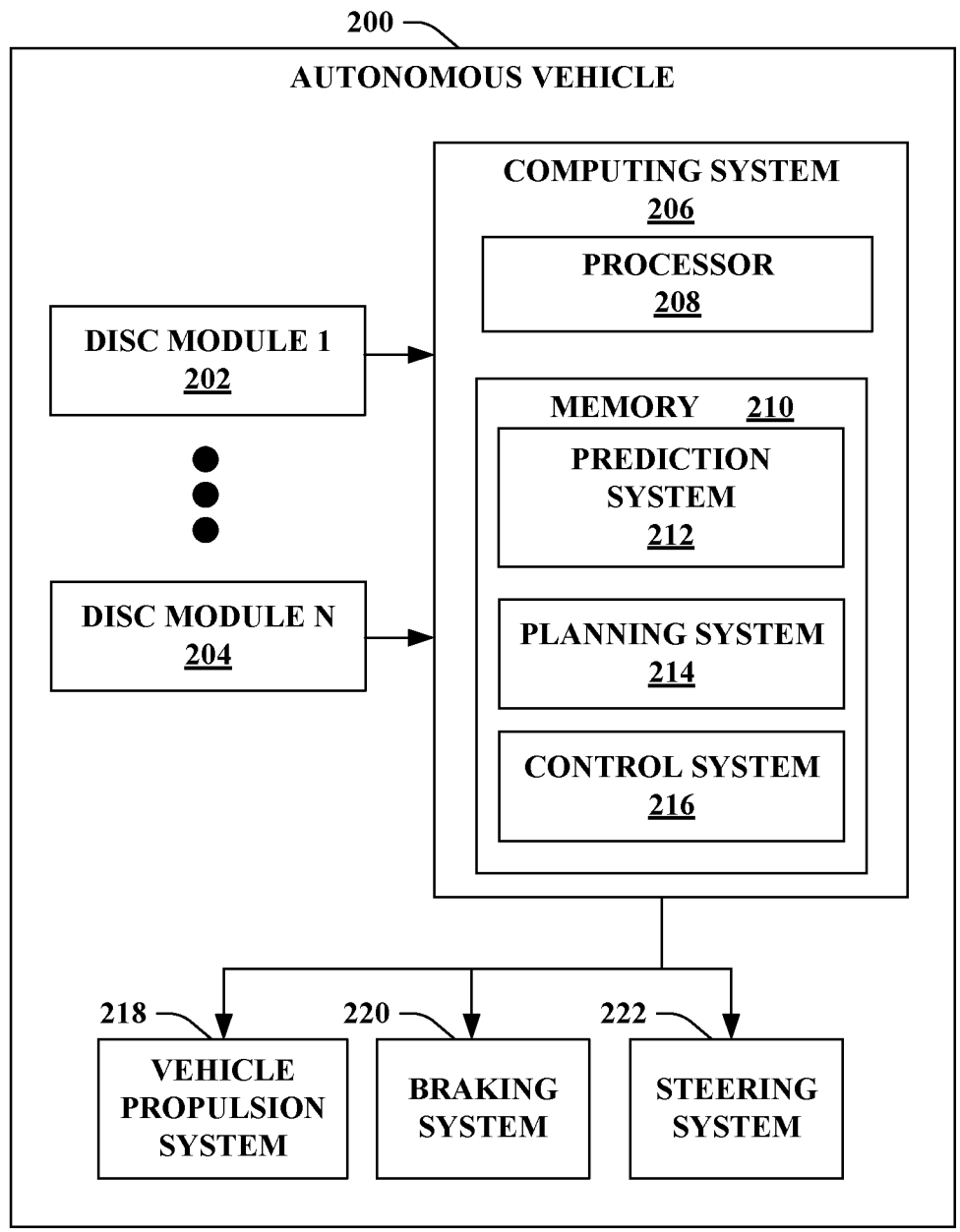
FIG. 2 illustrates a block diagram of an exemplary autonomous vehicle.

Now turning to FIG. 2, illustrated is an exemplary autonomous vehicle 200. The autonomous vehicle 200 includes a DISC module 1 202, . . . , and a DISC module N 204, where N can be substantially any integer greater than one (collectively referred to herein as DISC modules 202-204). The DISC modules 202-204 can each be substantially similar to the DISC module 100. While many of the examples set forth herein describe the autonomous vehicle 200 including more than one DISC module 202-204, it is contemplated that the autonomous vehicle 200 can include one DISC module (e.g., the DISC module 1 202).

The autonomous vehicle 200 can navigate about roadways without a human driver based upon data outputted from the DISC modules 202-204. As described herein, the DISC modules 202-204 can each be or include a system on chip (SoC) that includes integrated sensor systems, processing, memory, localization system(s), and/or a communication system.

The autonomous vehicle 200 additionally comprises a computing system 206 that is in communication with the DISC modules 202-204. The computing system 206 can receive data generated by the DISC modules 202-204. Thus, rather than receiving raw sensor signals from various types of sensor systems distributed around an autonomous vehicle, the DISC modules 202-204 included in the autonomous vehicle 200 can perform edge computing, allowing the sensor data to be processed in a multi-sensor integrated manner. Outputs of the processing performed by the DISC modules 202-204 can thereafter be transmitted to the computing system 206. For example, the computing system 206 can receive data indicative of an object detected by a DISC module (e.g., the DISC module 1 202 can detect an object based on received sensor signals and can transmit data indicative of the object to the computing system 206).

As described herein, the DISC modules 202-204 can each include a respective communication system. Outputs of the DISC modules 202-204 can be wirelessly transmitted to the computing system 206 (e.g., using secure Wi-Fi, a personal long term evolution (LTE) network). For instance, the DISC module 1 202 can cause the communication system integrated therein to wireless transmit data indicative of an object detected by the DISC module 1 202 to the computing system 206, and the computing system 206 can wirelessly receive the data indicative of the object as detected. According to an example, a frequency of a communication signal may fall within a range of approximately 28-30 GHz; however, the claimed subject matter is not so limited. Wireless communication between the DISC modules 202-204 and the computing system 206 can reduce wiring complexity and weight of wiring harnesses in the autonomous vehicle 200. However, according to other embodiments, it is contemplated that a wired connection can be utilized between a DISC module (or a plurality of the DISC modules 202-204) and the computing system 206.

The computing system 206 of the autonomous vehicle 200 can further include a processor 208 and memory 210 that includes computer-executable instructions that are executable by the processor 208. In an example, the processor 208 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 210 can include a prediction system 212 and a planning system 214. The prediction system 212 can predict location(s) of object(s) in an environment in which the autonomous vehicle 200 operates (e.g., for a future looking period of time). The prediction system 212 can utilize the data from the DISC modules 202-204 as input for generating the predictions. In various embodiments, it is contemplated that at least a portion of a prediction system can instead be executed in a distributed manner by the DISC modules 202-204 (e.g., the DISC module 1 202 can generate a predicted path for a detected object). Moreover, although not shown, it is also contemplated that at least a portion of the perception system 110 of the DISC module 100 can instead be executed by the computing system 206 of the autonomous vehicle 200. Further, the planning system 214 can plan operation (e.g., maneuvers, routes) of the autonomous vehicle 200 at least in part based on the predicted location(s) of the object(s) in the environment. Moreover, the memory 210 can include a control system 216 configured to control operation of the autonomous vehicle 200 based on data received from the DISC modules 202-204 (e.g., as planned by the planning system 214). More particularly, the control system 216 can generate control signal(s) to control operation of one or more mechanical systems of the autonomous vehicle 200.

The autonomous vehicle 100 additionally includes several mechanical systems that are used to effectuate appropriate motion of the autonomous vehicle 200 based upon the control signal(s) generated by the control system 216. For instance, the mechanical systems can include, but are not limited to, a vehicle propulsion system 218, a braking system 220, and a steering system 222. The vehicle propulsion system 218 may include an electric motor, an internal combustion engine, a combination thereof, etc. The braking system 220 can include an engine break, brake pads, actuators, and/or any other suitable componentry that is configured to assist in decelerating the autonomous vehicle 200. The steering system 222 includes suitable componentry that is configured to control the direction of movement of the autonomous vehicle 200 during propulsion.

The DISC modules 202-204 are distributed around the autonomous vehicle 200. For instance, the DISC modules 202-204 are oriented on the autonomous vehicle 200 towards differing portions of an environment in which the autonomous vehicle 200 is located. According to an example, each of the DISC modules 202-204 can have a field of view on the order of 30-40 degrees in an azimuthal direction around the autonomous vehicle 200 (e.g., ten DISC modules 202-204 can be positioned around the autonomous vehicle 200 to provide a combined 360 degree field of view in the azimuthal direction around the autonomous vehicle 200); however, other fields of view are intended to fall within the scope of the hereto appended claims (e.g., the DISC modules 202-204 can have fields of view greater than 30-40 degrees to allow for graceful degradation should one of the DISC modules 202-204 fail). Moreover, it is contemplated that the fields of view can partial overlap or completely overlap; yet, the claimed subject matter is not so limited.

Figure 3:
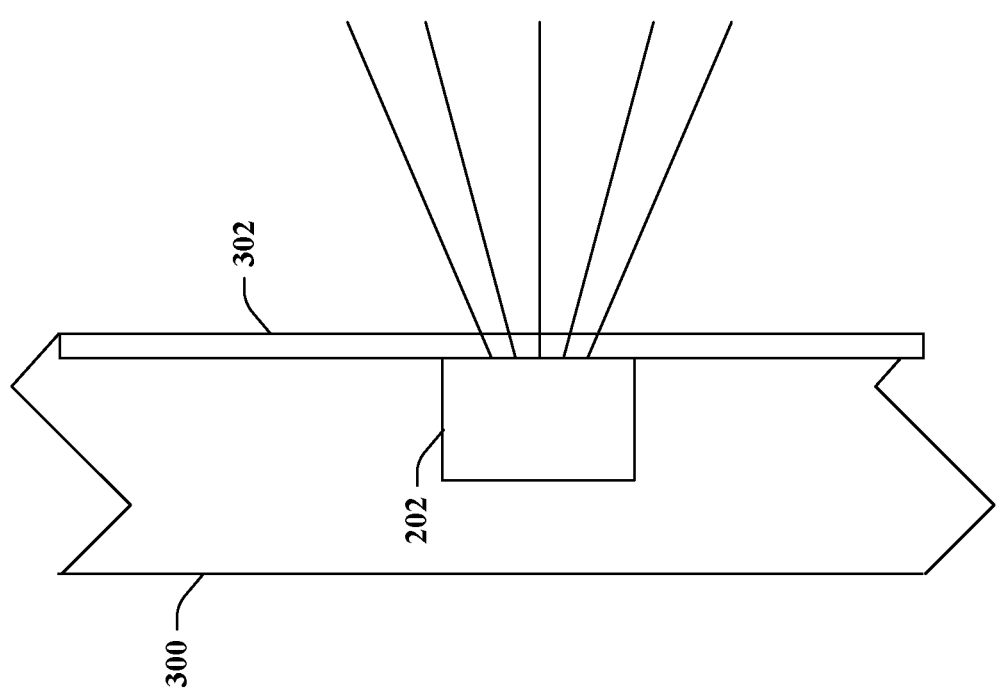
FIG. 3 illustrates a cross sectional view of a portion of a structure of an autonomous vehicle in which a DISC module is embedded.

The DISC modules 202-204 may be mounted on a surface of the autonomous vehicle 200 and/or embedded therein. For example, the DISC module 1 202 (or a plurality of the DISC modules 202-204) can be embedded in a structure of the autonomous vehicle 200. Turning to FIG. 3, illustrated is a cross sectional view of a portion of a structure 300 of an autonomous vehicle (e.g., the autonomous vehicle 200). In the depicted example, the DISC module 1 202 is embedded in the structure 300. The structure 300, for example, can be a frame of the autonomous vehicle, a body of the autonomous vehicle, or the like. Moreover, a cover 302 can be positioned over the DISC module 1 202; the cover 302 can be transparent to signals upon which the sensor systems of the DISC module 1 202 operate (e.g., light, laser beams, radar beams, etc. can pass through the cover 302).

Figure 4:
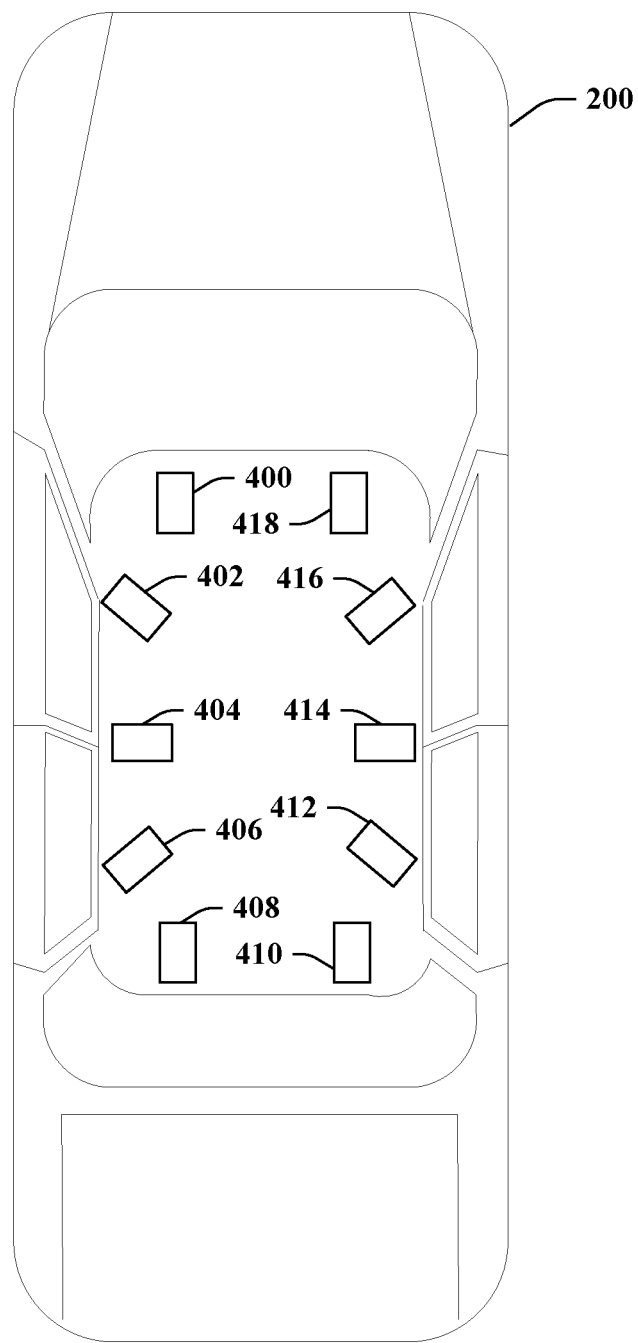
FIG. 4 illustrates a top view of an exemplary autonomous vehicle that includes a plurality of DISC modules.

With reference now to FIG. 4, illustrated is a top view of the autonomous vehicle 200. The exemplary autonomous vehicle 200 depicted in FIG. 4 includes ten DISC modules, namely, a DISC module 400, a DISC module 402, a DISC module 404, a DISC module 406, a DISC module 408, a DISC module 410, a DISC module 412, a DISC module 414, a DISC module 416, and a DISC module 418 (collectively referred to herein as DISC modules 400-418) (e.g., the DISC modules 202-204 of FIG. 2). It is contemplated that more or less than ten DISC modules 400-418 can be included in the autonomous vehicle 200. The DISC modules 400-418 may be mounted on surfaces of the autonomous vehicle 200, embedded in structures of the autonomous vehicle 200, or a combination thereof. Thus, the DISC modules 400-418 can be distributed around the autonomous vehicle 200 to provide 360 degree perception around the autonomous vehicle 200.

The DISC modules 400-418 can be disposed along a common plane (e.g., on a roof of the autonomous vehicle 200 at a common height from the ground) or along multiple planes (e.g., on the roof, a fender, and a trunk). Thus, while the DISC modules 400-418 of FIG. 4 are shown as all being on or embedded in a roof of the autonomous vehicle 200, in other embodiments at least some of the DISC modules 400-418 can be incorporated in other portions of the autonomous vehicle 200 (e.g., incorporated into a bumper, a door, a hood) and/or at different heights from the ground. In an exemplary embodiment, the ten DISC modules 400-418 may be oriented at 30-40 degrees apart from one another. Accordingly, the DISC modules 400-418 can have at least partially overlapping fields of view.

Pursuant to an example, if one or more of the DISC modules 400-418 fail, such failure can be tolerated and a graceful degradation process can begin in a timely manner. For instance, objects can be tracked within two cycles after detection by a DISC module. This coarse tracking can allow early detection of objects (e.g., pedestrians, cars pulling out to a lane from a parked position or driveway, etc.).

Figure 5:
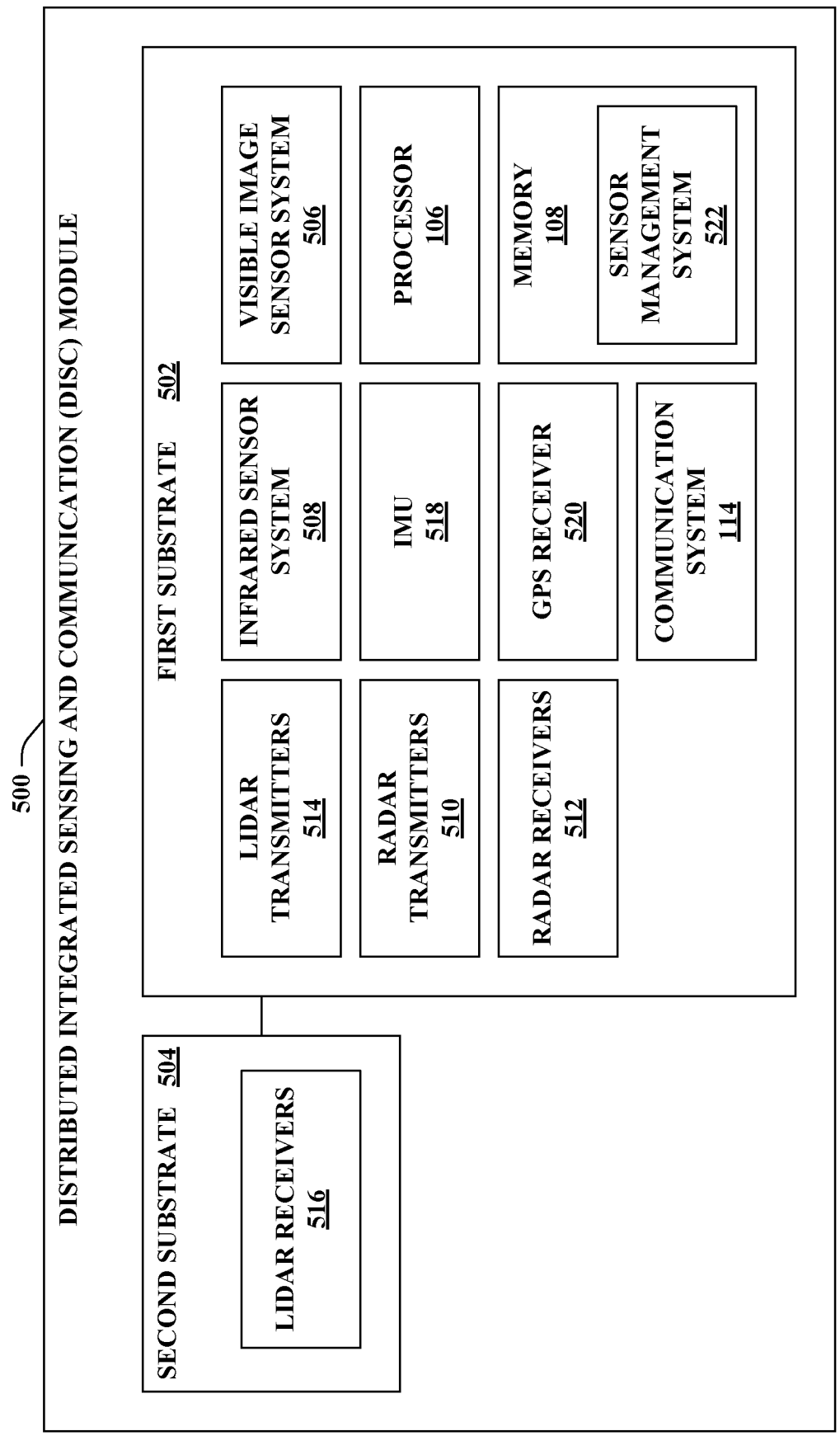
FIG. 5 illustrates a block diagram of another exemplary DISC module.

Now turning to FIG. 5, illustrated is another exemplary DISC module 500 (e.g., the DISC module 100, one of the DISC modules 202-204, one of the DISC modules 400-418). Similar to above, the DISC module 500 includes at least a first sensor system, a second sensor system, the processor 106, and the memory 108. The DISC module 500 includes a first substrate 502; the first sensor system, at least a portion of the second sensor system, the processor 106, and the memory 108 are integrated on the first substrate 502 (e.g., the first substrate 502 is a single substrate). The DISC module 500 further includes a second substrate 504 that is electrically coupled with the first substrate 502. The first substrate 502 and the second substrate 504 can be in a common packaging or housing. The first substrate 502 and the second substrate 504 are separate from each other in the DISC module 500.

According to an example, the first substrate 502 can be formed of silicon and the second substrate 504 can be formed of a III-V semiconductor material. Examples of III-V semiconductor material include, but are not limited to, gallium arsenide, gallium phosphide, indium nitride, indium phosphide, and so forth.

In the example depicted in FIG. 5, a visible image sensor system 506, an infrared sensor system 508, and a radar sensor system can be integrated on the first substrate 502. More particularly, the radar sensor system can include one or more radar transmitters 510 and one or more radar receivers 512; the radar transmitters 510 and the radar receivers 512 can be integrated on the first substrate 502. Further, as shown, a portion of a lidar sensor system can be integrated on the first substrate 502, and a differing portion of the lidar sensor system can be integrated on the second substrate 504. For instance, the lidar sensor system can include one or more lidar transmitters 514 and one or more lidar receivers 516. For instance, the lidar transmitters 514 can be integrated on the first substrate 502, and the lidar receiver 516 can be integrated on the second substrate 504.

Pursuant to an example, the visible image sensor system 506 can output a visible image sensor signal, the infrared sensor system 508 can output an infrared sensor signal, the lidar sensor system can output a lidar sensor signal, and the radar sensor system can output a radar sensor signal. Accordingly, a perception system of the DISC module 500 (e.g., the perception system 110 included in the memory 108) can detect an object based on the visible image sensor signal, the lidar sensor signal, the radar sensor signal, and the infrared sensor signal.

Moreover, the communication system 114 can be integrated on the first substrate 502. Further, an IMU 518 and/or a GPS receiver 520 can be integrated on the first substrate 502. Again, as noted above, the memory 108 can include a perception system (e.g., the perception system 110). The perception system can be configured to determine a position/trajectory of an object captured in the sensor signals obtained by the sensor systems of the DISC module 500. Moreover, the position/trajectory of the object can be detected based on information outputted by the IMU 518 and/or the GPS receiver 520.

The memory 108 can further include a sensor management system 522 that can control the lidar sensor system and/or the radar sensor system. For instance, the sensor management system 522 can control the lidar transmitters 514 during a given time period. The lidar transmitters 514 can be controlled by the sensor management system 522 by causing a first subset of the lidar transmitters 514 to transmit during the given time period and by causing a second subset of the lidar transmitters 514 to not transmit during the given time period. Further, the lidar transmitters 514 can be controlled by the sensor management system 522 by controlling a power level of the lidar transmitters 514 in the first subset (that are transmitting) during the given time period.

The lidar transmitters 514 can include an array of sources that emit laser signals into an environment. The sensor management system 522 can adaptively change the power level by controlling the power for individual sources in the array as well as a number of sources in the array. Thus, the lidar transmitters 514 can be an optical phased array. The phase of the energy emitted by the lidar transmitters 514 can be controlled to control a direction of a laser beam emitted thereby. Moreover, the lidar receivers 516 can be avalanche photodiode (APD) receivers.

Further, the radar transmitters 510 can include an array of transmit antennas, and the radar receivers 512 can include an array of receive antennas. The radar sensor system can be a W-band radar sensor system; however, other radar bands are intended to fall within the scope of the hereto appended claims (e.g., V-band, millimeter band, Ka-band, K band). The transmit antennas and/or the receive antennas can be a phased array of antennas. Moreover, it is contemplated that the sensor management system 522 can control the phased array of antennas. Accordingly, an electromagnetic phased array can be used for the radar sensor system.

Again, the DISC module 500 includes a plurality of sensor systems (the visible image sensor system 506, the infrared sensor system 508, the radar sensor system as well as the lidar transmitters 514 of the lidar sensor system) formed on the first substrate 502 (e.g., form of silicon), and the lidar receivers 516 (e.g., APD receivers) formed on the second substrate 504 (e.g., formed of a Group III-V semiconductor material). The lidar receivers 516 integrated on the second substrate 504 can receive reflected signals emitted by the lidar transmitters 514 (e.g., a solid-state laser and lens for transmission). The lidar receivers 516 are configured to convert captured light into electrical signals using the photoelectric effect. Further, a readout integrated circuit can readout accumulated photocurrent from each pixel of the lidar receivers 516 and transfer a resultant signal onto output taps for readout and digitization.

Moreover, the IMU 518 can be configured to generate position information by detecting at least one of a specific force, angular rate, or magnetic field surrounding the DISC module 500, for example, using any of an accelerometer, a gyroscope, and a magnetometer. The IMU 518 may enable the GPS receiver 520 to maintain its functionality when conventional GPS signals are unavailable for detection, such as inside a tunnel or when electronic interference otherwise inhibits signal detection.

Further, while one processor 106 is depicted in FIG. 5, it is contemplated that the DISC module 500 can include a plurality of processors. For instance, the separate sensor systems (or a subset thereof) included in the DISC module 500 can include separate processors. By way of illustration, it is contemplated that the radar sensor system may include a radar signal processor, the lidar sensor system can include a lidar signal processor, and so forth. Moreover, it is contemplated that the communication system 114 can include a radio frequency and baseband processor. However, the claimed subject matter is not limited to the foregoing examples.

Figure 6:
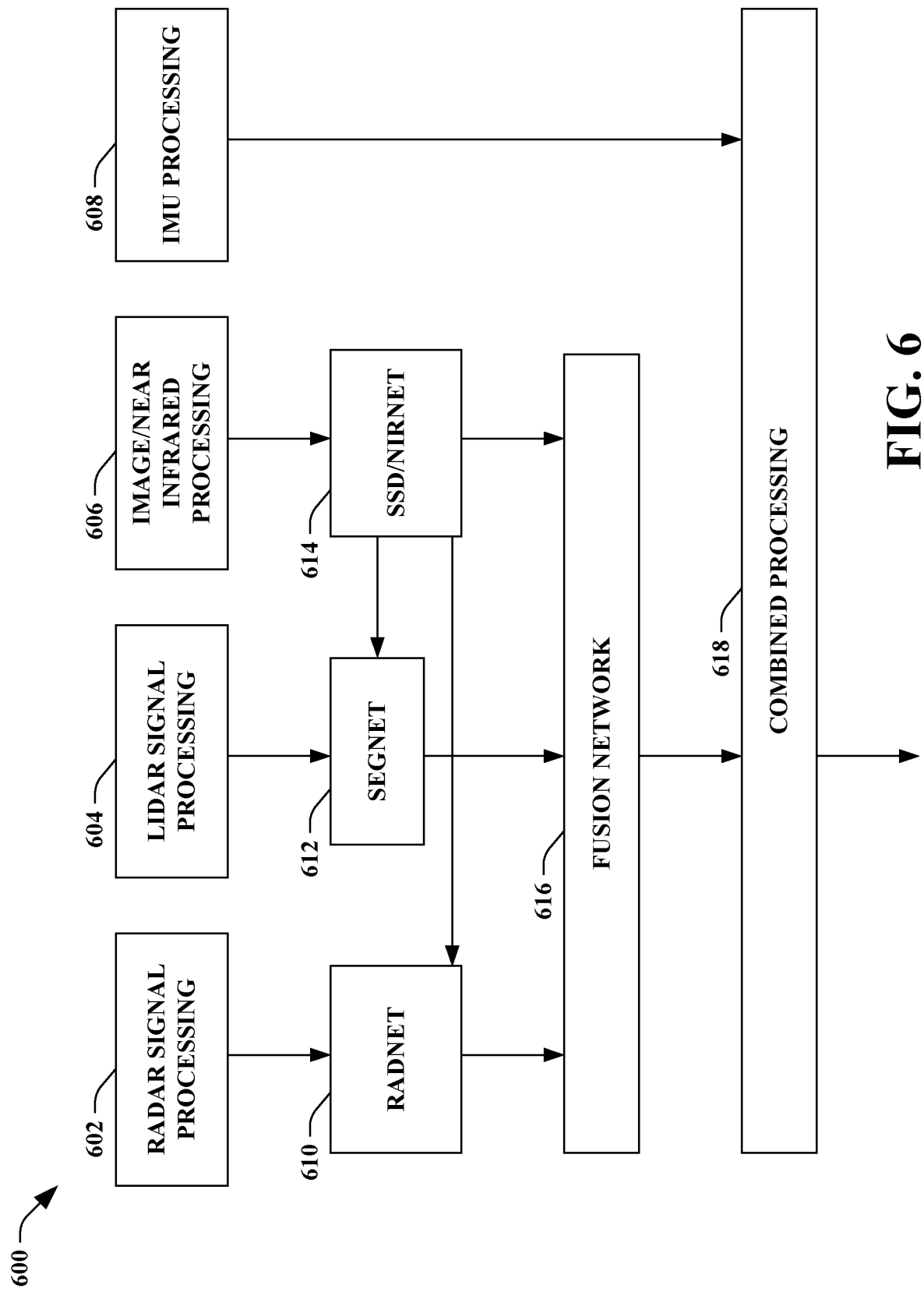
FIG. 6 illustrates an exemplary diagram showing processing of sensor signals generated by the DISC module.

With reference now to FIG. 6, illustrated is a diagram 600 showing processing of sensor signals generated by the DISC module 500. As shown at 602, radar signal processing can be performed on a radar sensor signal. Moreover, at 604, lidar signal processing can be performed on a lidar sensor signal. Further, at 606, image/near infrared processing can be performed on a visible image sensor signal and/or an infrared sensor signal. At 608, IMU processing can be performed on output from the IMU 518. Although not shown, it is contemplated that a preprocessing step that filters unreliable sensor signal information from sensor signals received from the sensor systems can be performed at 602-608.

Sensor signal information outputted at 602-606 can be used as input for a trained neural network (or neural networks) or a combination of signal processing algorithms and neural network(s) to identify, detect, and track an object captured in the sensor signals. Moreover, sensor signal information outputted at 608 can be subsequently combined at 618.

In an exemplary embodiment, the trained neural networks can include a radar network (RadNet) 610, a segmentation network (SegNet) 612, and a signal shot detect network (SSDNet)/near infrared network (NIRNet) 614. Input to the RadNet 610 can be the radar sensor signals provided by the radar signal processing at 602 to determine the configuration of an object captured in a radar sensor signal. The SegNet 612 incorporates a deep encoder-decoder architecture for multi-class pixelwise segmentation to determine the configuration of an object captured in a lidar sensor signal outputted by the lidar signal processing at 604. Sensor systems that provide sensor signal information to the SSD-Net/NIRNet 614 include, but are not limited to, image sensor systems and NIR sensor systems. The neural networks generate outputs which are provided to a fusion network 616. Additionally, an output of the SSDNet/NIRNet 614 may be provided to at least one of the RadNet 610 or the SegNet 612 for further detection of objects captured in the sensor signals. Moreover, the neural networks 610-616 can be combined with signal processing algorithms.

The fusion network 616 fuses outputs received from each of the neural networks to generate a fused sensor signal. For example, a field of view captured in a radar sensor signal may be matched with a field of view captured in an image sensor signal to define a fused sensor signal that represents information captured by the plurality of sensor systems. The fusion network 616 outputs the fused sensor signal for combined processing 618 with the output of the IMU processing at 608. In particular, position information defined by an IMU is associated with one or more objects captured in the sensor signals to generate an integrated sensor signal that facilitates course tracking of an object with respect to the autonomous vehicle, determining the state/configuration of the object, and calculating probabilities with respect to potential object trajectories based upon the fused sensor signal.

Figure 7:
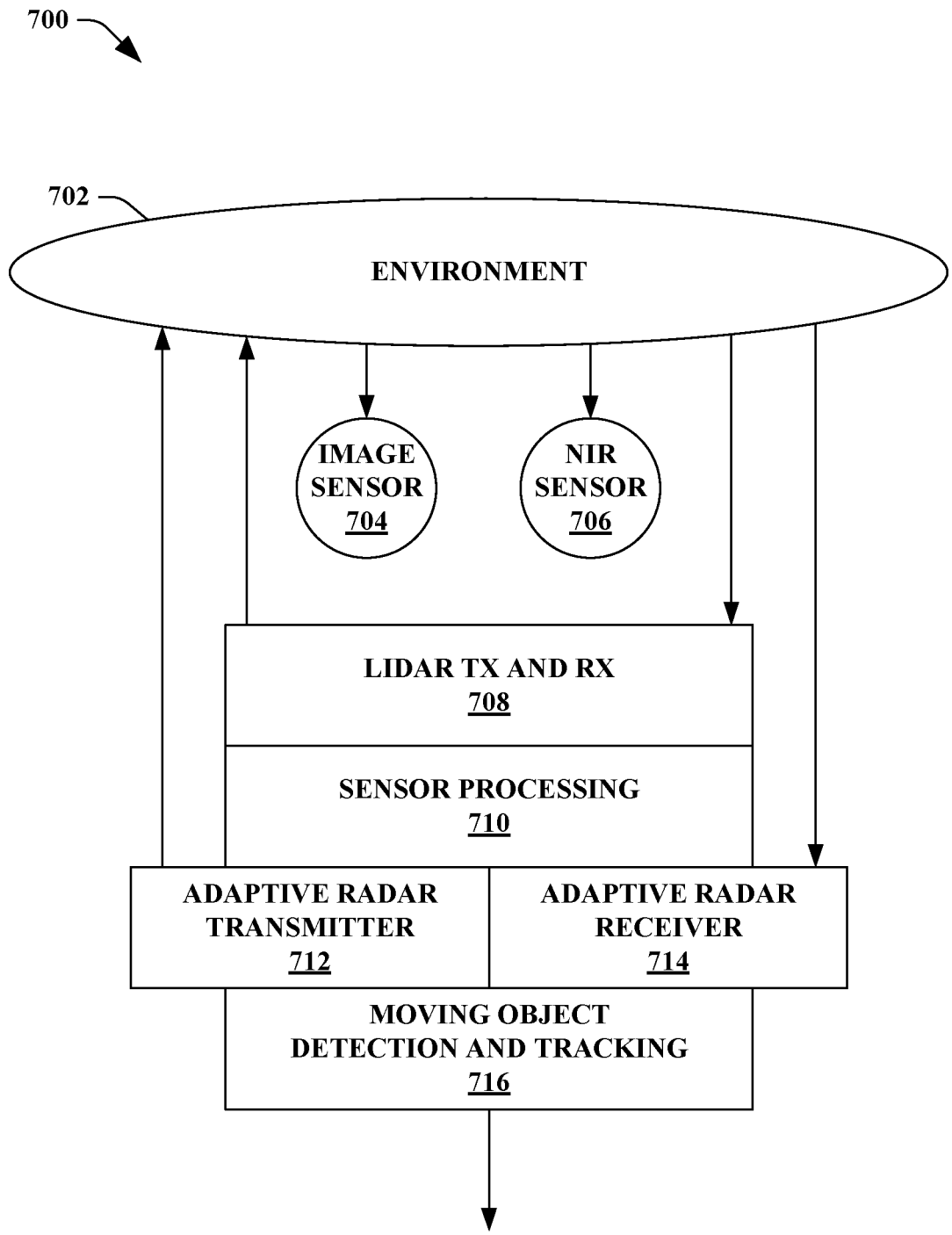
FIG. 7 illustrates an exemplary diagram showing a dynamic feedback loop defined by transmit sensor signals, an environment, and receive sensor signals.

With reference now to FIG. 7, a diagram 700 illustrates a dynamic feedback loop defined by transmit sensor signals, an environment 702, and receive sensor signals. As shown in the diagram 700, an adaptive radar transmitter 712 transmits into the environment 702. Likewise a lidar transmitter (of as well as a lidar Tx and Rx sensor system 708) transmits into the environment 702. Thus, transmitters of the sensor systems (708, 712) are configured to propagate sensor signals toward the environment 702. Sensor signals that reflect off an object disposed in the environment 702 may be received by at least one of an adaptive radar receiver 714 or a receiver of the lidar Tx and Rx sensor system 708. In the diagram 700, an image sensor system 704 and a NIR sensor system 706 are illustrated as passive sensor systems that receive information from the environment 702 but do not propagate sensor signals toward the environment 702.

Outputs generated by the image sensor system 704, the NIR sensor system 706, the lidar Tx and Rx sensor system 708, and the adaptive radar receiver 714 are provided to a sensor processing module 710 that processes the sensor signals (e.g., as shown in FIG. 6). A fused sensor signal is generated by the sensor processing module 710 and provided to a moving object detection and tracking module 716, where position information is associated with objects incorporated in the fused sensor signal to track location information and object trajectory.

Reference is now generally made to a DISC module (e.g., the DISC module 100, one of the DISC modules 202-204, one of the DISC modules 400-418, the DISC module 500) describe herein. A sensor system of the DISC module can include a plurality of transmit (Tx) antennas and a plurality of receive (Rx) antennas, which can be energized according to instructions stored in the memory of the DISC module. The processor of the DISC module can execute instructions that cause the plurality of transmit antennas in the sensor system to be energized such that a portion (e.g., leakage) of a signal emitted by the plurality of transmit antennas is cancelled. Thus, when the signal reflects off an object, cancellation of the portion of the signal/leakage mitigates undesirable interference that could otherwise inhibit the plurality of receive antennas in the sensor system from desirably capturing the reflection. In an exemplary embodiment, a phased array can be configured to generate wave energy that is electrically steered by the plurality of transmit antennas to cancel the leakage. The phased array can be synchronized according to instructions executed by the processor to cancel leakage from the plurality of transmit antennas during energization of the plurality of transmit antennas.

Each type of sensor system (e.g., lidar, radar, camera, etc.) incorporated in the DISC module can generate a sensor signal that captures a field of view from the autonomous vehicle. When a plurality of different sensor signal types is generated, the sensor signals can be fused based upon the field of view to define an integrated sensor signal for controlling the autonomous vehicle.

Figure 8:
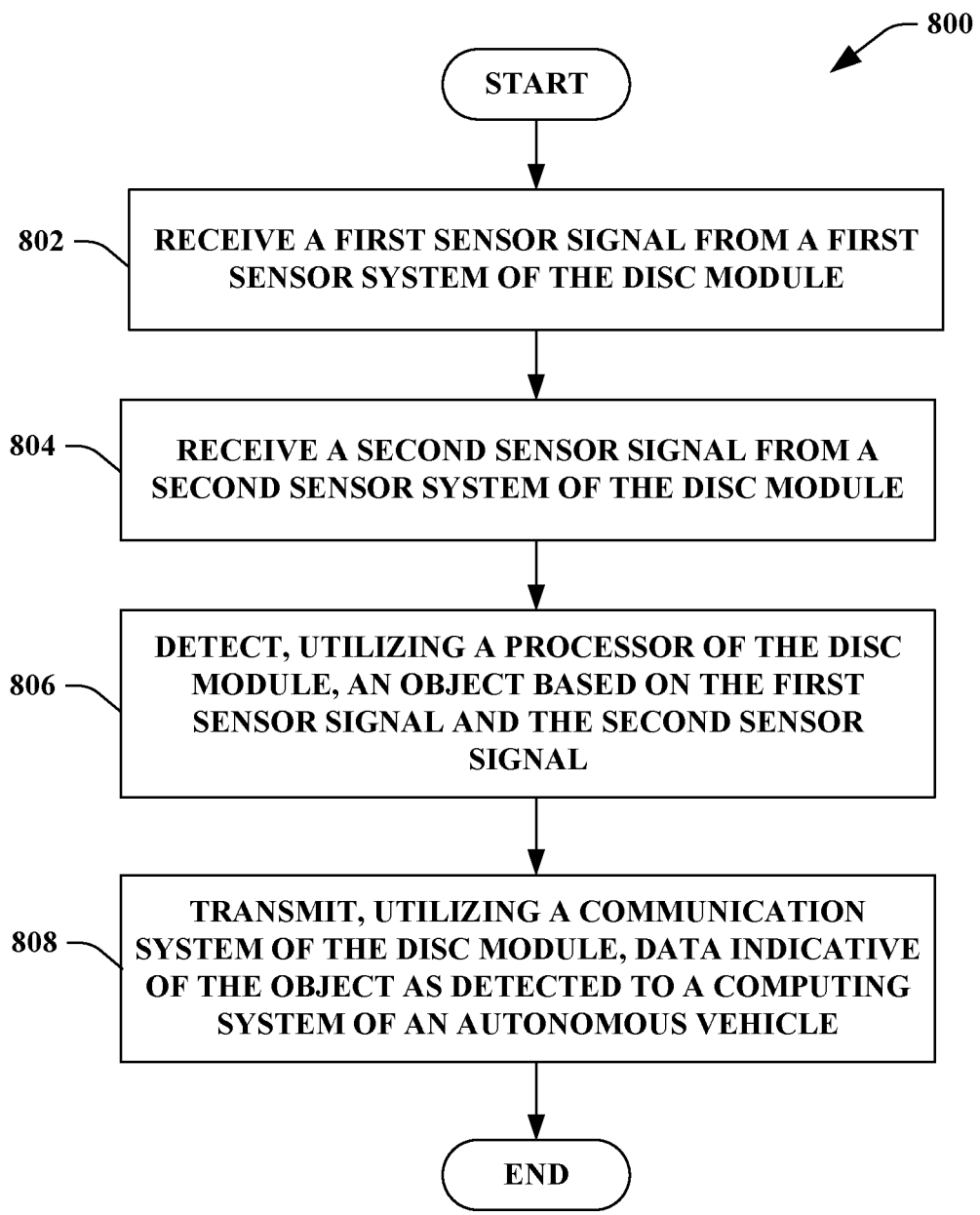
FIG. 8 is a flow diagram illustrating an exemplary methodology of operating a DISC module.

FIG. 8 illustrates an exemplary methodology relating to controlling an autonomous vehicle utilizing a DISC module included in the autonomous vehicle. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 8, illustrated is an exemplary methodology 800 of operating a distributed integrated sensing and communication (DISC) module. The DISC module can be included in an autonomous vehicle. At 802, a first sensor signal can be received from a first sensor system of the DISC module. At 804, a second sensor signal can be received from a second sensor system of the DISC module. The first sensor system and the second sensor system are different types of sensor systems. At 806, an object can be detected, utilizing a processor of the DISC module, based on the first sensor signal and the second sensor signal. At 808, data indicative of the object as detected can be transmitted to a computing system of an autonomous vehicle utilizing a communication system of the DISC module. Moreover, the first sensor system, at least a portion of the second sensor system, the processor, and the communication system are integrated on a single substrate of the DISC module.

Figure 9:
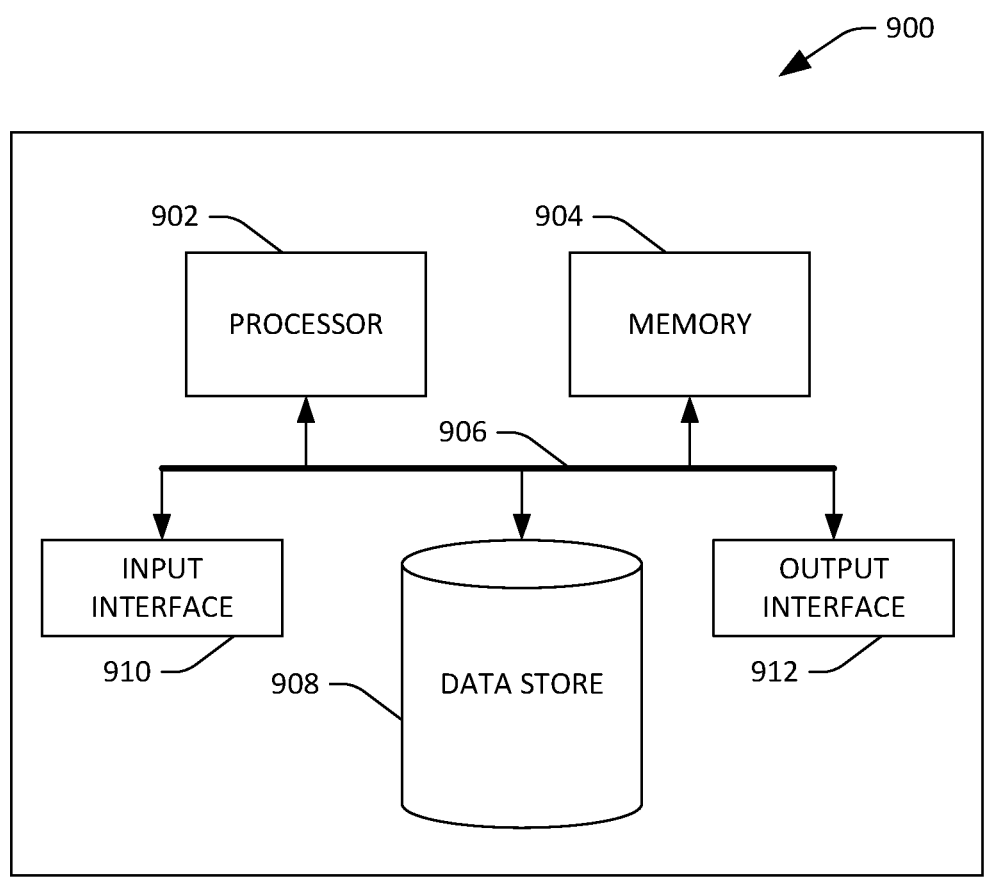
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 206. The computing device 900 includes at least one processor 902 that executes instructions that are stored in a memory 904. The instructions may be, for instance, instructions for implementing functionality described as being carried out by one or more modules and systems discussed above or instructions for implementing one or more of the methods described above. In addition to storing executable instructions, the memory 904 may also store location information, distance information, direction information, etc.

The computing device 900 additionally includes a data store 908 that is accessible by the processor 902 by way of the system bus 906. The data store 908 may include executable instructions, location information, distance information, direction information, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 218, the braking system 220, and/or the steering system 222 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims.

What is claimed is:

1. A distributed integrated sensing and communication (DISC) module of an autonomous vehicle, comprising:
    a housing of the DISC module;
    a silicon substrate in the housing;
    a III-V semiconductor substrate in the housing, wherein the III-V semiconductor substrate is separate from the silicon substrate;
    an image sensor system, a radar sensor system, transmitters of a lidar sensor system, a processor, and memory formed on the silicon substrate; and
    receivers of the lidar sensor system formed on the III-V semiconductor substrate;
    wherein:
        the image sensor system is configured to output image data captured from an environment nearby the DISC module;
        the radar sensor system is configured to output radar data captured from the environment;
        the lidar sensor system is configured to output lidar data captured from the environment; and
        the memory stores computer-executable instructions that, when executed by the processor, cause the processor to perform acts comprising:
            detecting an object in the environment nearby the DISC module based on the image data, the radar data, and the lidar data;
            performing a first tracking of the object over time; and
            transmitting data indicative of the object as detected and the first tracking of the object from the DISC module to a computing system of the autonomous vehicle, wherein the computing system comprising a processor, wherein the computing system is separate from the housing of the DISC module in the autonomous vehicle, wherein the computing system performs a second tracking of the object over time based on the data from the DISC module, and wherein the computing system controls operation of at least one of a vehicle propulsion system, a braking system, or a steering system of the autonomous vehicle based on the data from the DISC module and the second tracking of the object over time.

2. The DISC module of claim 1, the memory further stores computer-executable instructions that, when executed by the processor, cause the processor to perform acts comprising:
    controlling the lidar transmitters during a given time period, the controlling of the lidar transmitters during the given time period comprises:
        causing a first subset of the lidar transmitters to transmit during the given time period;
        controlling a power level of the lidar transmitters in the first subset during the given time period; and
        causing a second subset of the lidar transmitters to not transmit during the given time period.

3. The DISC module of claim 1, further comprising:
an inertial measurement unit (IMU) formed on the silicon substrate.

4. The DISC module of claim 1, wherein the image sensor system is a visible image sensor system, and wherein the image data comprises a visible image of the environment.

5. The DISC module of claim 4, further comprising:
an infrared sensor system configured to output infrared data captured from the environment;
wherein the object is further detected based on the infrared data captured from the environment; and
wherein the infrared sensor system is further formed on the silicon substrate.

6. The DISC module of claim 1, the first sensor system further comprising:
a phased array of antennas; and
wherein the memory further stores computer-executable instructions that, when executed by the processor, cause the processor to perform acts comprising:
controlling the phased array of antennas.

7. The DISC module of claim 1, the memory further stores computer-executable instructions that, when executed by the processor, cause the processor to perform acts comprising:
generating a predicted path of the object detected in the environment for a future looking period of time;
wherein the data transmitted to the computing system of the autonomous vehicle comprises data indicative of the predicted path of the object.

8. The DISC module of claim 1, further comprising: a global positioning system (GPS) receiver formed on the silicon substrate.

9. The DISC module of claim 1, wherein the image sensor system is an infrared sensor system, and wherein the image data comprises infrared data captured from the environment.

10. The DISC module of claim 1, wherein the DISC module is embedded in a frame of the autonomous vehicle.

11. The DISC module of claim 1, wherein the DISC module is embedded in a body of the autonomous vehicle.

12. The DISC module of claim 1, wherein detecting the object in the environment comprises:
inputting, to a first neural network, the image data to cause a first output to be outputted from the first neural network;
inputting, to a second neural network, the radar data and the first output from the first neural network to cause a second output to be outputted from the second neural network; and
inputting, to a third neural network, the lidar data and the first output from the first neural network to cause a third output to be outputted from the third neural network;
wherein the object is detected in the environment based on the first output from the first neural network, the second output from the second neural network, and the third output from the third neural network.

13. An autonomous vehicle, comprising:
a vehicle propulsion system;
a braking system;
a steering system;
a computing system comprising a processor; and
a distributed integrated sensing and communication (DISC) module, the DISC module comprising:
a housing of the DISC module;
a silicon substrate in the housing;
a III-V semiconductor substrate in the housing, wherein the III-V semiconductor substrate is separate from the silicon substrate;
an image sensor system, a radar sensor system, transmitters of a lidar sensor system, a processor, and memory formed on the silicon substrate; and
receivers of the lidar sensor system formed on the III-V semiconductor substrate;
wherein:
the image sensor system is configured to output image data captured from an environment nearby the autonomous vehicle;
the radar sensor system is configured to output radar data captured from the environment;
the lidar sensor system is configured to output lidar data captured from the environment; and
the memory stores computer-executable instructions that, when executed by the processor, cause the processor to perform acts comprising:
detecting an object in the environment nearby the autonomous vehicle based on the image data, the radar data, and the lidar data;
performing a first tracking of the object over time; and
transmitting data indicative of the object as detected and the first tracking of the object to the computing system;
wherein the computing system is separate from the housing of the DISC module in the autonomous vehicle, wherein the computing system is in communication with the DISC module, wherein the computing system is configured to receive the data from the DISC module, wherein the computing system performs a second tracking of the object over time based on the data from the DISC module, and wherein the computing system is further configured to control operation of at least one of the vehicle propulsion system, the braking system, or the steering system of the autonomous vehicle based on the data received from the DISC module and the the second tracking of the object over time.

14. The autonomous vehicle of claim 13, further comprising at least one disparate DISC module, wherein the DISC module and the at least one disparate DISC module are oriented on the autonomous vehicle towards differing portions of the environment in which the autonomous vehicle is located.

15. The autonomous vehicle of claim 14, wherein the computing system performs the second tracking of the object further based on data from the at least one disparate DISC module.

16. The autonomous vehicle of claim 13, the memory of the DISC module further stores computer-executable instructions that, when executed by the processor of the DISC module, cause the processor to perform acts comprising:
generating a predicted path of the object detected in the environment for a future looking period of time;
wherein the data transmitted from the DISC module to the computing system of the autonomous vehicle comprises data indicative of the predicted path of the object.

17. The autonomous vehicle of claim 13, wherein the DISC module is embedded in at least one of a frame of the autonomous vehicle or a body of the autonomous vehicle.

18. The autonomous vehicle of claim 13, wherein detecting the object in the environment comprises:
inputting, to a first neural network, the image data to cause a first output to be outputted from the first neural network;

inputting, to a second neural network, the radar data and the first output from the first neural network to cause a second output to be outputted from the second neural network; and inputting, to a third neural network, the lidar data and the first output from the first neural network to cause a third output to be outputted from the third neural network;

wherein the object is detected in the environment based on the first output from the first neural network, the second output from the second neural network, and the third output from the third neural network.

19. A method of operating a distributed integrated sensing and communication (DISC) module, comprising:

capturing image data of an environment nearby the DISC module utilizing an image sensor system of the DISC module;

capturing radar data of the environment utilizing a radar sensor system of the DISC module;

capturing lidar data of the environment utilizing a lidar sensor system of the DISC module;

detecting, utilizing a processor of the DISC module, an object in the environment nearby the DISC module based on the image data, the radar data, and the lidar data;

performing, utilizing the processor of the DISC module, a first tracking of the object detected in the environment over time; and transmitting data indicative of the object as detected and the first tracking of the object to a computing system of an autonomous vehicle, wherein the computing system comprising a processor;

wherein the computing system is separate from the DISC module in the autonomous vehicle, wherein the computing system performs a second tracking of the object over time based on the data from the DISC module, wherein the computing system controls operation of at least one of a vehicle propulsion system, a braking system, or a steering system of the autonomous vehicle based on the data from the DISC module and the second tracking of the object over time, wherein the image sensor system, the radar sensor system, transmitters of the lidar sensor system, and the processor are formed on a silicon substrate, and wherein receivers of the lidar sensor system are formed on a III-V semiconductor substrate separate from the silicon substrate.

20. The method of claim 19, wherein detecting the object in the environment comprises:

inputting, to a first neural network, the image data to cause a first output to be outputted from the first neural network;

inputting, to a second neural network, the radar data and the first output from the first neural network to cause a second output to be outputted from the second neural network; and inputting, to a third neural network, the lidar data and the first output from the first neural network to cause a third output to be outputted from the third neural network;

wherein the object is detected in the environment by the DISC module based on the first output from the first neural network, the second output from the second neural network, and the third output from the third neural network.

* * * * *